United States Patent [19]

Hofstetter et al.

[11] 4,306,857

[45] Dec. 22, 1981

[54] CONVEYOR WITH HEATING MEANS

[75] Inventors: Robert W. Hofstetter, Fenton; William P. Young, Southfield, both of Mich.

[73] Assignee: I & H Conveying and Machine Company, Clio, Mich.

[21] Appl. No.: 143,371

[22] Filed: Apr. 24, 1980

[51] Int. Cl.³ .......................... F27B 9/00; A23L 3/00
[52] U.S. Cl. ...................... 432/121; 99/360; 99/362; 266/127; 432/140; 432/197
[58] Field of Search ............ 432/121, 140, 197; 266/120, 124, 127; 99/360, 362

[56] References Cited

U.S. PATENT DOCUMENTS

| | | | |
|---|---|---|---|
| 1,356,055 | 10/1920 | Eick | 99/362 |
| 2,303,122 | 11/1942 | Heineman | 266/120 |
| 2,732,788 | 1/1956 | Meyer | 99/360 |
| 3,476,574 | 11/1969 | Schack et al. | 99/360 |

FOREIGN PATENT DOCUMENTS 2424706  5/1979  France .................................. 99/359

*Primary Examiner*—John J. Camby
*Attorney, Agent, or Firm*—Gifford, VanOphem, Sheridan & Sprinkle

[57] ABSTRACT

An apparatus is provided for heating a continuing series of articles, such as canned or bottled potable goods, to substantially room temperature in order to prevent condensation from forming on the containers. The apparatus comprises an elongated housing having an interior housing chamber and open on each longitudinal end. An endless conveyor transports the articles from one open end of the housing and to the other end of the housing along a substantially horizontal plane. An elongated trough is disposed under the conveyor and is partially filled with heating water so that the articles are partially submerged in the water as they are transported through the housing. A recirculation system is also provided for continuously reheating the heating water.

6 Claims, 3 Drawing Figures

CONVEYOR WITH HEATING MEANS

BACKGROUND OF THE INVENTION

I. Field of the Invention

The present invention relates generally to conveyors and, more particularly, to a conveyor with means for heating articles as they are transported by the conveyor.

II. Description of the Prior Art

The canning or bottling of potable goods, such as carbonated beverages, is typically carried out at a relatively low temperature, for example, 35 degrees F. Such a low temperature during the canning or bottling of the potable goods prevents foaming of the carbonated beverage during filling.

Following the bottling or canning process, however, excessive water condensation on the exterior of the can or bottle is a common occurrence due to the low temperature of the can or bottle. Such water condensation, moreover, is disadvantageous for a number of reasons. In the event that the article is a bottle, the water condensation will prevent labels from adhering to the bottle. In the event that the article is a can, such cans are typically placed in cardboard containers and water condensation on the exterior of the can will wet and weaken these cardboard containers.

In view of the undesirability of water condensation on the bottles or cans prior to their labeling and/or packaging, it has been the previous practice to first heat these containers following the bottling or canning operation to approximately room temperature, i.e., 72–75 degrees F. Once these containers are heated to room temperature, water condensation on the container is virtually eliminated.

It has been the previous practice to use hot water sprays to heat the containers to room temperature. Typically, the conveyors are transported along a conveyor line while a hot water sprayer above the conveyor line sprays water down onto the containers and, in doing so, heats them to room temperature. After impinging on the bottles, the water from the spray is either drained away to the available sewage system or reheated for recirculation to the sprayer.

These previously known water spray devices for the heating the containers on the conveyor line, are not efficient in operation. First, the water emitting from the sprayers must be extremely hot in order to merely heat the containers to room temperature. Moreover, the mere impingement of the hot water on the containers results in inefficient heat transfer between the water and the container and, in addition, some of the water from the sprayers misses the containers altogether and directly enters the drain. This, of course, results in no heat transfer whatsoever between the water and the containers.

A still further disadvantage of these previously known hot water sprays is that the water which enters the drain and is subsequently disposed of is still relatively hot although somewhat cooler than the water emitting from the sprayer. The disposal of this relatively hot water still further increases the energy inefficiency of these previously known systems.

SUMMARY OF THE PRESENT INVENTION

The present invention overcomes the above mentioned disadvantages of the previously known devices by providing a conveyor with heating means particularly designed to warm containers of potable goods to substantially room temperature and which is energy efficient in operation.

In brief, the conveyor system according to the present invention comprises an elongated housing open at each end and defining an interior housing chamber. An endless conveyor is operatively coupled with the housing and transports articles, such as bottled and canned potable products, from one opening of the conveyor and to the other open end of the conveyor substantially along a horizontal plane throughout the conveyor housing. In addition, an elongated trough is positioned around and underneath the conveyor belt within the housing chamber.

The conveyor system of the present invention further comprises a holding tank for holding a liquid, preferably water, and which has a relatively large volumetric capacity. A first pump has its inlet connected to the holding tank and its outlet connected to a heat exchange unit while the outlet from the heat exchange unit is returned to the holding tank. Upon actuation of the first pump, the water in the holding tank is pumped from it, through the heat exchanger and subsequently returned to the holding tank. The heat exchanger, moreover, is preferably thermostatically controlled so that the water within the holding tank remains within a predetermined and relatively narrow temperature range.

A second pump also has its inlet connected to the holding tank while its outlet is connected to a water distributor or sprayer mounted within the housing chamber and above the conveyor track upon which the articles are transported through the housing. Moreover, the sprayer is arranged within the housing so that, upon actuation of the second pump, the hot water from the holding tank is sprayed downwardly and onto the articles as they are transported along the conveyor line. The articles transported along the conveyor line, of course, are warmed as the hot water spray impinges upon them.

The water from the sprayer after impinging upon the articles, is collected within the trough and suitable drain means are provided on at least one and preferably both ends of the trough to return this water to the holding tank. However, the volumetric fluid flow from the sprayer and to the trough is sufficiently large so that the trough in effect forms a fluid reservoir having a fluid level within a predetermined range. Moreover, the fluid level within the reservoir is sufficiently high so that the articles transported by the conveyor are partially submerged within the reservoir as they are transported by the conveyor and through the conveyor housing on a level plane.

The partial submersion of the articles within the reservoir effectively enhances the overall heating of the articles so that the temperature of the holding tank water can be maintained at a lower temperature than with the previously known hot water sprays.

The present invention is further advantageous in that the relatively hot water which is continually drained from the reservoir is not simply discarded but rather returned to the holding tank reservoir for heating and recirculation through the hot water sprayer. This arrangement provides significant energy savings since the temperature differential between the reservoir water and the water in the holding tank is considerably less than the temperature differential between the holding tank temperature and ordinary tap water.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
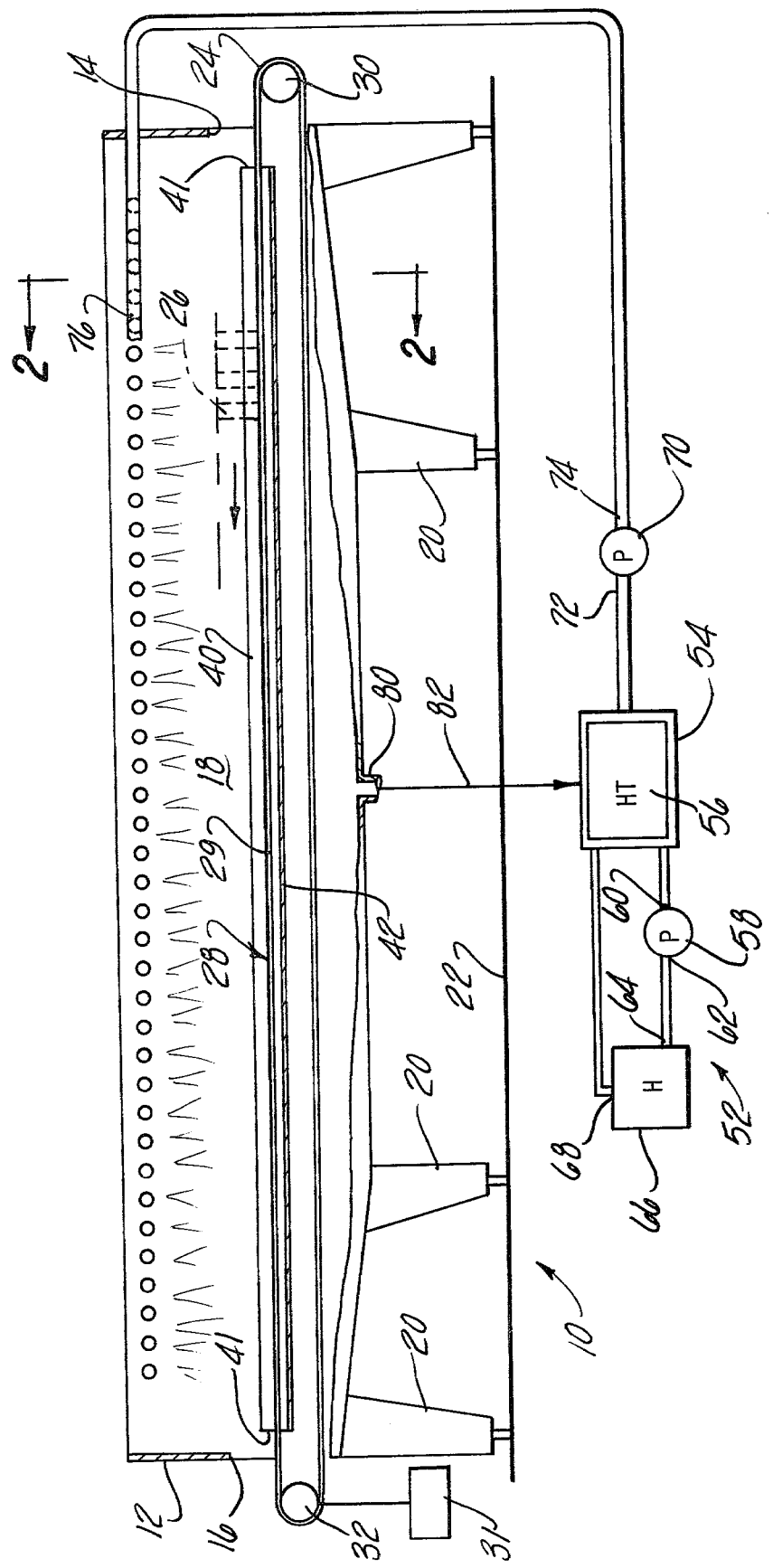
FIG. 1 is a side diagrammatic view illustrating the conveyor system with heating means according to the present invention.

With reference first to FIG. 1, the conveyor system 10 according to the present invention is thereshown and comprises a housing 12 open at each end 14 and 16 and defining an interior housing chamber 18. The housing 12 is mounted by suitable support legs 20 which engage a ground support surface 22.

A conveyor means 24 is operatively associated with the housing for transporting articles 26 from one open end 14 of the housing 12 and to its other open end 16 and thus through the housing chamber 18. As shown, the conveyor means 24 comprises an endless belt 28 having a lead roller 30 and a tail end roller 32. In the conventional manner, the endless belt 28 travels through and transports the articles 26 through the housing chamber and, moreover, the endless conveyor belt 28 is arranged so that its upper section 29 lies in substantially a horizontal plane. By doing so, tippage of the containers 26 on the conveyor belt 28 is virtually eliminated. Any conventional motor means 31 (illustrated only diagrammatically) can be used to drive the belt 28.

Figure 2:
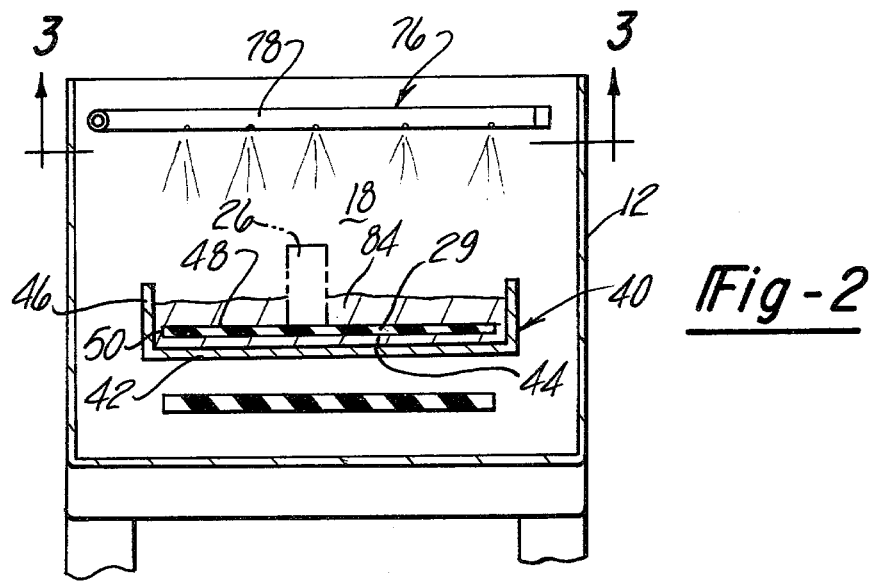
FIG. 2 is a sectional view taken substantially along line 2—2 in FIG. 1.

With reference now to FIGS. 1 and 2, an elongated and generally U-shaped trough 40 open at each end 41 is secured within the housing chamber 18 and extends from substantially one end 14 of the housing 12 and to the other end 16. The trough 40 has a base portion 42 which is positioned under and closely adjacent the bottom 44 of the conveyor belt upper section 29 while the lateral sides 46 of the trough 40 extend upwardly and above the upward surface 48 of the conveyor belt 28. Moreover, the lateral sides 46 of the trough 40 are closely adjacent the sides 50 of the conveyor belt 28.

Referring again to FIG. 1, the conveyor system 10 further includes means 52 for heating the articles 26 as they are transported from one end 14 of the housing 12 and to its opposite end 16. The heating means 52 comprises a holding tank 54 having an interior chamber 56 with a relatively large volumetric capacity. The holding tank 54 is filled with a liquid, preferably and hereafter called water, used to heat the articles 26.

A pump 58 has its inlet 60 connected to the holding tank chamber 56 while the outlet 62 from the pump 58 is fluidly connected to the inlet 64 of a heat exchanger 66. The heat exchanger 66 may be of any conventional construction and has its outlet 68 fluidly connected to the interior chamber 56 of the holding tank 54.

Upon actuation of the pump 58, the water is continually pumped from the holding tank chamber 56, through the heat exchanger 66 and subsequently returned to the holding tank chamber 56. The heat exchanger 56, moreover is preferably thermostatically controlled so that it maintains the temperature of the water within the holding tank chamber 56 within a predetermined temperature range, for example, 120°–140° F.

Figure 3:
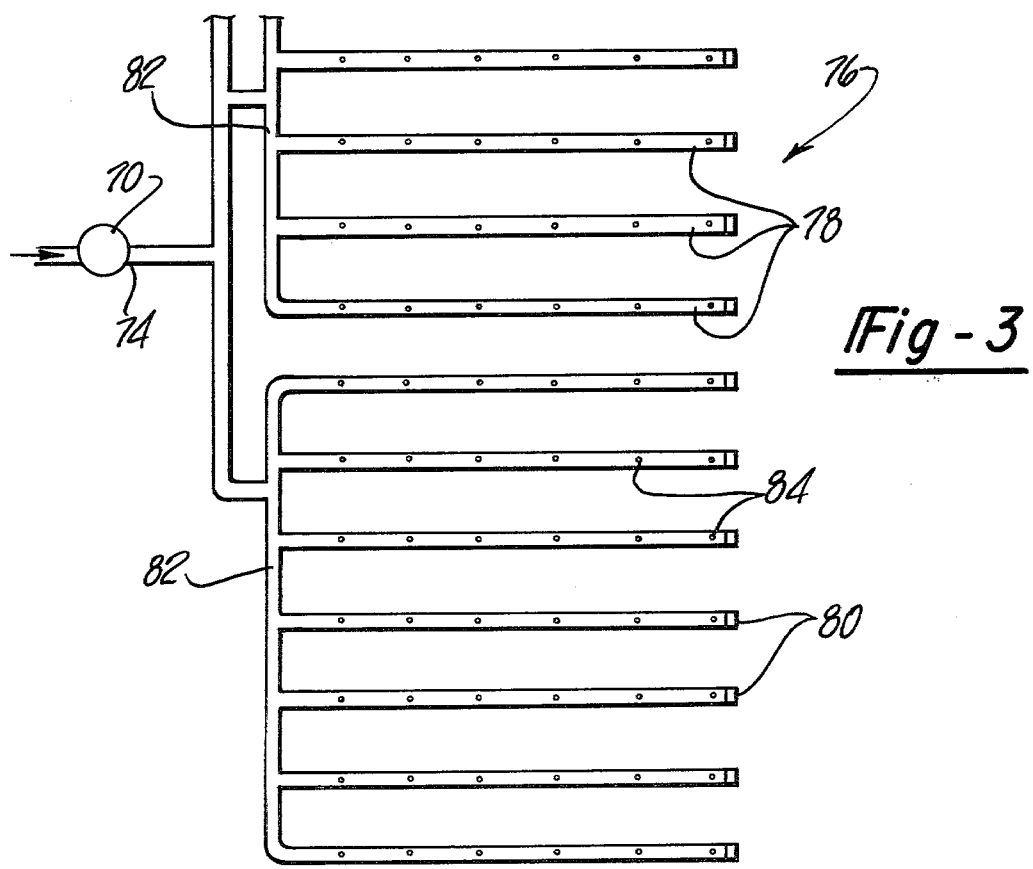
FIG. 3 is a view taken substantially along line 3—3 in FIG. 2.

With reference now to FIGS. 1–3, a second pump 70 has its inlet 72 connected to the holding tank chamber 56 and its outlet 74 connected to a water sprayer 76 disposed within the housing chamber 18 above the endless belt 28. The water sprayer 76, best shown in FIG. 3, comprises a series of spaced and parallel conduits 78 which extend laterally across the conveyor belt substantially along its entire length within the housing chamber 18. Each of the conduits 78 is closed at one end 80 and at its other end is connected to a conduit 82 which in turn is connected to the outlet 74 from the pump 70. A plurality of spaced apertures 84 are formed to the bottom of each conduit 78 so that, upon actuation of the second pump 70, heated water from the holding tank 54 is sprayed downwardly and on top of the articles 26 as they are transported through the interior 18 of the housing 12.

Referring now to FIGS. 1 and 2, the water from the sprayer 76 is collected within the trough 40 after impinging upon the articles 26 on the conveyor belt 28. This water flows out through the open ends 41 of the trough 40 and to a drain so formed in the bottom of the housing 12. The drain 80, in turn, is fluidly connected by a suitable conduit 82 to the interior chamber 56 of the holding tank 54. Thus, the water flow through the water sprayer 76 is continuously recirculated through the holding tank 54 and back to the sprayer 76.

Referring now particularly to FIG. 2, the water flow through the sprayer 76 and into the trough 40 is of a sufficiently large volumetric quantity that the water level 84 within the trough 40 is maintained at a predetermined level somewhat above the upper surface 48 of the conveyor belt upper section 29 so that the lower portion of the articles 26 are submerged below the water lever 84 in the trough 40. In this fashion, the trough 40 in effect forms a fluid reservoir. Moreover, in practice, a water level of approximately 1 to 1½ inches above the upper surface 48 of the conveyor belt 28 has proven most efficient in operation as will be shortly described.

In the operation of the conveyor system 10 according to the present invention, the conveyor belt continuously transports a series of articles, such as bottles or cans of potable products, through the interior of the housing. As the articles are transported through the housing, the actuation of the second pump 70 sprays hot water onto the articles thus warming them in the well known fashion. Unlike the previously known hot water sprays, however, the articles 26 are partially submerged below the water level 84 within the trough 40 and, since the water within the trough 40 is relatively warm, aids in the overall heating of the articles 26. The heat rise from the hot water within the trough 40 likewise aids in heating the articles 26 so that the articles 26 exit from the outlet end 16 of the housing 12 at substantially room temperature.

The water from the trough reservoir is continuously drained via the drain 80 and conduit 82 to the holding tank 54 rather than wastefully disposed through the available sewage system or the like. The water within the holding tank 54 in addition is continuously heated by the pump 58 and heat exchanger 66 so that the water within the heating tank 54 is maintained at a relatively constant temperature despite the continual introduction of the relatively cool water from the trough reservoir into the holding tank 54. The continual operation of the conveyor means 24, the second pump 70 and the first pump 58 is simultaneously and continuously carried out during the operation of the conveyor system 10 of the present invention.

The conveyor system 10 of the present invention is thus advantageous in a number of different respects. First, since the articles 26 are partially submerged below the fluid level 84 of the trough reservoir, the water within the trough reservoir aids in the overall heating of the articles 26 due to the direct contact of the articles 26 with the water in the reservoir. Consequently, the temperature of the water within the holding tank 54 can be maintained at a relatively low temperature, for example, 120°–140° F. and yet obtain the same heating as the previously known hot water sprays.

The present invention is further advantageous in that the articles 26 are conveyed by the conveyor belt 28 along substantially a horizontal plane from the inlet end 14 and to the outlet end 15 of the housing. Thus, tippage of the articles 26 on the conveyor belt 28 is virtually eliminated.

A still further advantage of the present invention is that the relatively hot water which is collected in the trough reservoir is returned directly to the holding tank rather than simply discarded or disposed of. Thus, due to the small temperature differential between the water within the trough reservoir and the water within the holding tank 56, only minimal heating of the water within the holding tank 54 is required. In this fashion, the conveyor system according to the present invention provides a highly energy efficient system.

A still further advantage of the present invention is that the trough is solid and acts as a thermal barrier between the hot water in the bottom of the housing and the containers in the trough. The trough thus prevents overheating of the containers which can result in pressure build up in the containers and also leaky containers.

From the foregoing, it can be seen that the conveyor system 10 according to the present invention provides many advantages over the previously known devices for heating bottles and cans of potable products.

Having described my invention, however, many modifications thereto will become apparent to those skilled in the art to which it pertains without deviation from the spirit of the invention as defined by the scope of the appended claims.

I claim:

1. Apparatus for heating a series of articles comprising:
   a housing having an interior housing chamber;
   an elongated reservoir formed in the bottom of the housing;
   means for transporting a continuing series of the articles substantially horizontally through said housing chamber from an inlet end of said housing and to an outlet end of said housing, said transporting means comprising a belt upon which said articles are supported,
   an elongated U-shaped trough having a base and a side portion extending upwardly from each side of the base, said trough base being positioned underneath and immediately adjacent said belt so that said trough side portions extend above the upper surface of the belt and wherein the ends of the trough are spaced inwardly from the inlet and outlet ends of the transporting means and positioned above said reservoir, and
   means for supplying a heated liquid to said trough in an amount sufficient to maintain a predetermined fluid level in the trough.

2. The invention as defined in claim 1 wherein said means for supplying liquid to said trough further comprises:
   a holding tank;
   means for continuously draining liquid from said reservoir and to said holding tank;
   a liquid heater having an inlet and an outlet;
   first means for pumping liquid from said holding tank and to said heater inlet;
   means for fluidly connecting said heater outlet to said holding tank; and
   second means for pumping liquid from said holding tank and to said trough.

3. The invention as defined in claim 2 wherein said second pump means further comprises a sprayer and a pump, said pump having an inlet connected to the holding tank and an outlet connected to said sprayer, said sprayer being positioned within said housing chamber and oriented so that said liquid sprays downward onto said articles as the articles are transported through said housing chamber.

4. The invention as defined in claim 1 wherein the liquid is water.

5. The invention as defined in claim 1 wherein only a portion of each article is submerged in the liquid in said trough as it is transported through said reservoir.

6. The invention as defined in claim 1 wherein said transporting means comprises an endless belt.

* * * * *

UNITED STATES PATENT AND TRADEMARK OFFICE
CERTIFICATE OF CORRECTION

PATENT NO. : 4,306,857

DATED : December 22, 1981

INVENTOR(S) : Robert W. Hofstetter, William P. Young

It is certified that error appears in the above—identified patent and that said Letters Patent is hereby corrected as shown below:

Column 4, line 25, insert --90-- after drain.

Column 4, line 25, after formed in, insert --the reservoir 88 formed in--.

Column 4, line 26, delete "80", insert --90--.

Column 4, line 27, delete "82", insert --92--.

Column 4, line 34, delete "84", insert --86--.

Column 4, line 38, delete "84", insert --86--.

Column 4, line 52, delete "84", insert --86--.

Column 4, line 59, after reservoir, insert --88--.

Column 4, line 60, delete "80", insert --90--.

Column 4, line 60, delete "82", insert --92--.

Column 4, line 67, after reservoir, insert --88--.

UNITED STATES PATENT AND TRADEMARK OFFICE
CERTIFICATE OF CORRECTION

PATENT NO. : 4,306,857                          Page 2 of 2

DATED : December 22, 1981

INVENTOR(S) : Robert W. Hofstetter, William P. Young

It is certified that error appears in the above—identified patent and that said Letters Patent is hereby corrected as shown below:

Column 5, line 8, delete "84", insert --86--.

Column 5, line 8, delete reservoir, insert --40--.

Column 5, line 9, delete reservoir, insert --40--.

Column 5, line 11, delete reservoir, insert --trough 40--.

Column 5, line 19, delete 15, insert --16--.

Column 5, line 24, after reservoir, insert --88--.

Column 5, line 34, delete "bottom of the housing", insert --reservoir 88--.

Signed and Sealed this

Twenty-seventh Day of July 1982

[SEAL]

*Attest:*

GERALD J. MOSSINGHOFF

*Attesting Officer*           *Commissioner of Patents and Trademarks*